(12) United States Patent
Yamaguchi et al.

(10) Patent No.: US 10,618,040 B2
(45) Date of Patent: Apr. 14, 2020

(54) CHABAZITE ZEOLITE FOR SUBSTRATE COATING

(71) Applicant: JGC CATALYSTS AND CHEMICALS LTD., Kanagawa (JP)

(72) Inventors: Yoko Yamaguchi, Fukuoka (JP); Shunji Tsuruta, Fukuoka (JP); Akira Nakashima, Fukuoka (JP)

(73) Assignee: JGC CATALYSTS AND CHEMICALS LTD., Kanagawa (JP)

( * ) Notice: Subject to any disclaimer, the term of this patent is extended or adjusted under 35 U.S.C. 154(b) by 0 days.

(21) Appl. No.: 16/343,207

(22) PCT Filed: Oct. 25, 2017

(86) PCT No.: PCT/JP2017/038415
§ 371 (c)(1),
(2) Date: Apr. 18, 2019

(87) PCT Pub. No.: WO2018/079569
PCT Pub. Date: May 3, 2018

(65) Prior Publication Data
US 2019/0240648 A1 Aug. 8, 2019

(30) Foreign Application Priority Data
Oct. 25, 2016 (JP) ................. 2016-208828

(51) Int. Cl.
*B01J 29/06* (2006.01)
*B01J 29/76* (2006.01)
*C01B 39/46* (2006.01)
*B01J 35/00* (2006.01)
*C01B 39/48* (2006.01)
(Continued)

(52) U.S. Cl.
CPC ............ *B01J 29/763* (2013.01); *B01D 53/94* (2013.01); *B01D 53/9418* (2013.01); *B01J 29/7015* (2013.01); *B01J 35/002* (2013.01); *B01J 35/006* (2013.01); *B01J 35/0013* (2013.01); *B01J 35/023* (2013.01); *B01J 35/1014* (2013.01); *B01J 37/0036* (2013.01); *B01J 37/0045* (2013.01); *B01J 37/0215* (2013.01); *B01J 37/0246* (2013.01); *B01J 37/30* (2013.01); *C01B 39/02* (2013.01); *C01B 39/026* (2013.01); *C01B 39/04* (2013.01); *C01B 39/46* (2013.01); *C01B 39/48* (2013.01); *F01N 3/2807* (2013.01); *B01D 2255/50* (2013.01); *B01J 29/084* (2013.01); *B01J 2229/16* (2013.01); *B01J 2229/186* (2013.01); *B01J 2229/37* (2013.01); *C01P 2002/01* (2013.01); *C01P 2002/60* (2013.01); *C01P 2002/72* (2013.01); *C01P 2002/86* (2013.01); *C01P 2004/51* (2013.01); *C01P 2004/61* (2013.01); *C01P 2004/62* (2013.01); *C01P 2006/12* (2013.01); *F01N 2330/02* (2013.01); *F01N 2330/12* (2013.01); *F01N 2510/063* (2013.01)

(58) Field of Classification Search
CPC .................. B01J 29/763; B01J 29/7015; B01J 2229/186; B01J 35/023; B01J 35/1014; B01J 37/0215; B01J 37/30; C01B 39/02; C01B 39/04; C01B 39/026; C01B 39/46; C01B 39/48; B01D 53/9418; B01D 2255/50; B01D 2255/20738; B01D 2255/20761
USPC ........ 502/60, 74, 4; 423/700, 701, 702, 704, 423/716, 718
See application file for complete search history.

(56) References Cited

U.S. PATENT DOCUMENTS

| 6,709,644 | B2 | 3/2004 | Zones et al. |
| 9,409,787 | B2 | 8/2016 | Chen et al. |

(Continued)

FOREIGN PATENT DOCUMENTS

| CN | 104129800 A | 11/2014 |
| CN | 104812469 A | 7/2015 |

(Continued)

OTHER PUBLICATIONS

International Search Report dated Nov. 28, 2017 filed in PCT/JP2017/038415.
Japanese Office Action dated Feb. 8, 2018 for the corresponding Japanese Patent Application No. 2017-564139.
Decision to Grant dated Mar. 8, 2018 for the corresponding Japanese Patent Application No. 2017-564139.
Eilertsen, Einar A., et al., NMR And and SAXS Analysis of Connectivity of Aluminum and Silicon Atoms in the Clear Sol Precursor of SSZ-13 Zeolite, Chemistry of Materials, Jan. 11, 2012, vol. 24, No. 3, pp. 571-578 (Cited in ISR; JPOA & Decision to Grant of JP2017-564139; English text).
Extended European Search Report ("EESR") issued in corresponding European Patent Application No. 17865367.1 dated Oct. 22, 2019.

(Continued)

*Primary Examiner* — Elizabeth D Wood
(74) *Attorney, Agent, or Firm* — Troutman Sanders LLP

(57) ABSTRACT

An object of the present invention is to provide a chabazite zeolite which does not easily peel from a substrate such as a honeycomb body even when the substrate has been coated therewith, while exhibiting excellent durability. The present invention relates to a chabazite zeolite for substrate coating, which includes (i) to (iv) below.
(i) Si and Al are contained,
(ii) an $SiO_2/Al_2O_3$ molar ratio is in a range of $5<SiO_2/Al_2O_3<10$,
(iii) an average crystal size is in a range of 0.05 μm<average crystal size<1 μm, and
(iv) in a spectrum measured by $^{27}$Al-NMR, a ratio ($A_{NFA}/A_{Total}$) between an area ($A_{Total}$) of all peaks in the spectrum and an area ($A_{NFA}$) of peaks assigned to Al other than tetracoordinated Al is in a range of $20\% \leq (A_{NFA}/A_{Total}) \leq 70\%$.

12 Claims, 2 Drawing Sheets

(51) Int. Cl.

| | |
|---|---|
| *B01J 37/00* | (2006.01) |
| *B01J 29/70* | (2006.01) |
| *B01J 35/02* | (2006.01) |
| *B01D 53/94* | (2006.01) |
| *B01J 37/02* | (2006.01) |
| *C01B 39/04* | (2006.01) |
| *C01B 39/02* | (2006.01) |
| *B01J 37/30* | (2006.01) |
| *B01J 35/10* | (2006.01) |
| *F01N 3/28* | (2006.01) |
| *B01J 29/08* | (2006.01) |

(56) References Cited

U.S. PATENT DOCUMENTS

| | | | |
|---|---|---|---|
| 9,517,942 | B2 | 12/2016 | Chen et al. |
| 9,878,313 | B2 | 1/2018 | Marin et al. |
| 2003/0176751 | A1 | 9/2003 | Strohmaier et al. |
| 2008/0202107 | A1 | 8/2008 | Boorse et al. |
| 2008/0226545 | A1 | 9/2008 | Bull et al. |
| 2008/0292519 | A1 | 11/2008 | Caudle et al. |
| 2011/0182790 | A1 | 7/2011 | Chandler et al. |
| 2013/0266785 | A1 | 10/2013 | Chen et al. |
| 2015/0218007 | A1 | 8/2015 | Chen et al. |
| 2016/0101415 | A1 | 4/2016 | Ji et al. |
| 2016/0271596 | A1 | 9/2016 | Marin et al. |
| 2018/0186648 | A1 | 7/2018 | Feyen et al. |
| 2018/0264445 | A1* | 9/2018 | Onozuka ............. B01J 35/023 |

FOREIGN PATENT DOCUMENTS

| | | |
|---|---|---|
| CN | 105314648 A | 2/2016 |
| CN | 105858679 A | 8/2016 |
| JP | H05-004048 | 1/1993 |
| JP | 2005-520763 A | 7/2005 |
| JP | 5499042 B2 | 5/2014 |
| JP | 5683111 B2 | 3/2015 |
| WO | 2015/185625 A2 | 12/2015 |

OTHER PUBLICATIONS

Mintova, S., "Verified Syntheses of Zeolitic Materials" 410 pages submitted (Jan. 1, 2016) XP055395933, Retrieved from the Internet: URL: http://www.iza-online.org/synthesis/VS_3rdEd.pdf [retrieved on Aug. 3, 2017].

Imai, H., et al., "Direct crystallization of CHA-type zeolite from amorphous aluminosilicate gel by seed-assisted method in the absence of organic-structure-directing agents" Microporous and Mesoporous Materials, 196:341-348 (Sep. 1, 2014) XP055143619, ISSN: 1387-1811, DOI: 10.1016/j.micromeso.2014.05.043.

Nedyalkova, R., et al. "Interzeolite Conversion of FAU Type Zeolite into CHA and its Application in NH3-SCR" Topics in Catslysis. 56(9-10):550-557 (Jun. 1, 2013).

Chinese Office Action ("CNOA") issued in corresponding Chinese Patent Application No. 201780064070.5 dated Dec. 4, 2019, with partial English translation.

* cited by examiner

CHABAZITE ZEOLITE FOR SUBSTRATE COATING

CROSS REFERENCE TO RELATED APPLICATIONS

This is U.S. National Phase Application under 35 U.S.C. § 371 of International Patent Application No. PCT/JP2017/038415, filed Oct. 25, 2017, which claims priority of Japanese Patent Application No. 2016-208828, filed Oct. 25, 2016. The entire contents of both applications are hereby incorporated by reference.

TECHNICAL FIELD

The present invention relates to a chabazite zeolite which does not easily peel from a substrate such as a honeycomb body even when the substrate is coated with the chabazite zeolite, while exhibiting excellent durability, and also relates to a manufacturing method of the chabazite zeolite.

BACKGROUND

Zeolite is a generic name for aluminosilicates having relatively large pores in its crystal structure. Zeolite has the following structure. That is, zeolite has a basic framework including silicon dioxide. A portion of the silicon is substituted with aluminum. Thus, the basic framework of zeolite is negatively charged. The charge is balanced by cations such as alkali metal contained in micropores. Zeolite is typically represented by general formula $xM_2O \cdot yAl_2O_3 \cdot zSiO_2 \cdot nH_2O$ (M is cationic metal such as alkali metal). Zeolite has a variety of characteristics depending on the type of a cation contained in the crystal.

The crystal structure of zeolite is classified based on structure codes by International Zeolite Association. For example, it is known that a plurality of crystal structures, such as faujasite, mordenite, and chabazite, exist. Chabazite (also called a chabazite structure) as one of the crystal structures of zeolite has a three-dimensional pore structure including an eight-membered oxygen ring. This crystal structure effectively acts in various uses such as catalysts and adsorbents. A zeolite having a chabazite structure is called a chabazite zeolite.

U.S. Pat. No. 6,709,644 discloses that a chabazite zeolite can be used for the separation of gas, the selective reduction of nitroxides contained in the exhaust gas from automobiles, the conversion of oxygen-containing hydrocarbon such as lower alcohol into liquid fuel, and a catalyst and a separation membrane for the manufacture of dimethylamine.

A chabazite zeolite is sometimes used as an active component of an automobile exhaust gas purification catalyst. In this case, a substrate such as a honeycomb body is usually coated with a chabazite zeolite together with an inorganic binder component (such as silica sol and alumina sol) by dip coating, wash coating, or the like. Exhaust gas flows through this substrate at a high space velocity (SV=about 10,000 to 100,000 $hr^{-1}$). Therefore, if an active component-containing coat layer of an automobile exhaust gas purification catalyst does not have sufficient strength, the coat layer peels. When the coat layer peels, the active component decreases. As a result, catalytic activity decreases. Thus, the chabazite zeolite used as an active component of an automobile exhaust gas purification catalyst is required not to easily peel from a substrate.

Japanese Patent No. 5499042 and Japanese Patent No. 5683111 disclose a chabazite zeolite used as an active component of an automobile exhaust gas purification catalyst. However, these chabazite zeolites easily peel from a substrate, coated with the chabazite zeolites, of an automobile exhaust gas purification catalyst. Therefore, there is a problem in that the chabazite zeolites do not have sufficient durability when the substrate has been coated.

SUMMARY OF THE INVENTION

The chabazite zeolite according to the present invention which contains Al being present outside the chabazite structure solves the above-described problems. The present invention provides a chabazite zeolite which does not easily peel from a substrate, such as a honeycomb body, coated therewith.

The present invention relates to a chabazite zeolite which has solved the above-described problems by the following configuration.

A chabazite zeolite for substrate coating, which includes (i) to (iv) below.

(i) Si and Al are contained.

(ii) The $SiO_2/Al_2O_3$ molar ratio is in a range of $5 < SiO_2/Al_2O_3 < 10$.

(iii) The average crystal size is in a range of 0.05 µm<average crystal size<1 µm.

(iv) In a spectrum measured by $^{27}$Al-NMR, the ratio ($A_{NFA}/A_{Total}$) between the area ($A_{Total}$) of all peaks in the spectrum and the area ($A_{NFA}$) of peaks assigned to Al other than tetracoordinated Al is in a range of $20\% \leq (A_{NFA}/A_{Total}) \leq 70\%$.

The peeling of zeolite from a substrate such as a honeycomb body coated with the chabazite zeolite according to the present invention (hereinafter, also referred to as the zeolite according to the present invention) is scarcer compared to known chabazite zeolites. Therefore, the chabazite zeolite according to the present invention has excellent durability.

DETAILED DESCRIPTION

Figure 1:
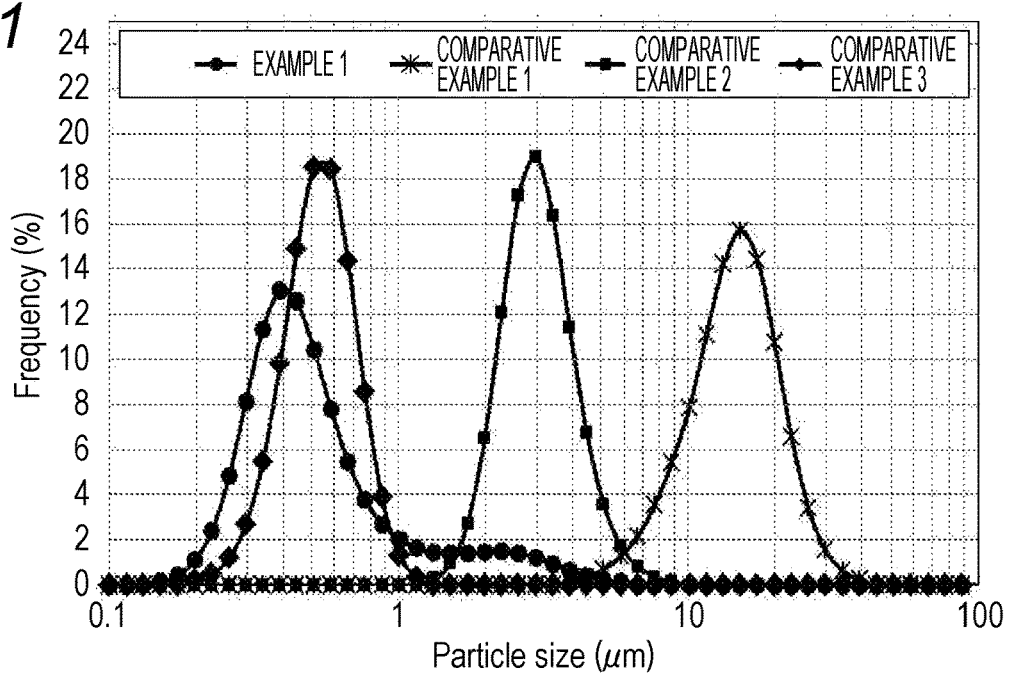
FIG. 1 is a graph of particle size distributions according to Example 1 and Comparative Examples 1 to 3.

Hereinafter, the present invention will be specifically described based on embodiments.

The zeolite according to the present invention is a chabazite zeolite including (i) to (iv) below.

(i) Si and Al are contained.

(ii) The $SiO_2/Al_2O_3$ molar ratio is in a range of $5 < SiO_2/Al_2O_3 < 10$.

(iii) The average crystal size is in a range of 0.05 µm<average crystal size<1 µm.

(iv) In a spectrum measured by $^{27}$Al-NMR, the ratio ($A_{NFA}/A_{Total}$) between the area ($A_{Total}$) of all peaks in the spectrum and the area ($A_{NFA}$) of peaks assigned to Al other than tetracoordinated Al is in a range of $20\% \leq (A_{NFA}/A_{Total}) \leq 70\%$.

The zeolite according to the present invention has a chabazite structure which contains Si, Al, and O as a basic framework element. This chabazite structure can be identified by the fact that the measurement pattern of X-ray diffraction has all of the peaks assigned to miller indices (100), (200), (20-1), (21-1), (211), (3-1-1), (310), and (3-1-2).

Preferably, the zeolite according to the present invention is substantially free of phosphorus (P) in the chabazite structure. Therefore, it is preferable that SAPO-34, which is a type of chabazite zeolites containing P in the crystal structure, or the like, be not contained in the zeolite according to the present invention. It is noted that when the content of P contained in the zeolite according to the present invention is 1000 ppm or less, it can be regarded and treated as being substantially free of P in the crystal structure.

The zeolite according to the present invention includes, in addition to Al (framework Al: hereinafter, also referred to as FA) constituting the framework of the chabazite structure, Al (non-framework Al: hereinafter, also referred to as NFA) existing outside the structure in a certain range of amount. The existence form of the non-framework Al is not known. However, it is estimated that non-framework Al exists in a form of oxides or the like. It is considered that the form of NFA does not affect the operation and effect of the present invention.

The zeolite according to the present invention includes NFA in a certain range of amount. Accordingly, the zeolite according to the present invention has the characteristic that it does not easily peel from a substrate when the substrate has been coated therewith. Specifically, peeling is scarcer on a substrate coated with the chabazite zeolite according to the present invention (for example, Example 1) compared to on a substrate coated with a chabazite zeolite containing little NFA (for example, Comparative Example 3). It is considered that this is because the NFA existing in the chabazite zeolite enhances the compatibility between the chabazite zeolite and an inorganic binder component such as silica and alumina, thereby having the function of firmly bonding the chabazite zeolite onto the surface of a substrate. Also, even if a substrate is coated with the zeolite according to the present invention without using an inorganic binder, the NFA contained in the chabazite zeolite exerts the function of enhancing the bonding performance between the substrate and the chabazite zeolite. This reduces peeling.

The Al contained in the zeolite according to the present invention is assigned to either FA or NFA. Whether the Al contained in the zeolite according to the present invention is assigned to FA or NFA can be determined by a spectrum obtained by $^{27}$Al-NMR measurement. FA is assigned to tetracoordinated Al in the spectrum obtained by $^{27}$Al-NMR measurement. On the other hand, NFA is assigned to a peak other than the tetracoordinated Al in the spectrum. Therefore, the ratio of NFA in all Als contained in the zeolite according to the present invention is defined by equation (1) below. It is noted that in the formula, $A_{NFA}$ is the area of peaks assigned to Al other than tetracoordinated Al in the spectrum, and $A_{Total}$ is the area of all peaks in the spectrum.

$$\text{Ratio of NFA in all Als contained in zeolite} = A_{NFA}/A_{Total} \quad (1)$$

According to the zeolite of the present invention, the ratio of NFA in all Als contained in the zeolite according to the present invention is in a range of $20\% \leq (A_{NFA}/A_{Total}) \leq 70\%$. Also, according to the zeolite of the present invention, this ratio is preferably in a range of $30\% \leq (A_{NFA}/A_{Total}) \leq 60\%$. When this ratio is less than 20%, the coat layer sometimes has insufficient strength. The ratio of more than 70% is not preferable, because the decrease of FA in the chabazite structure sometimes causes catalytic activity or the like to decrease.

In the zeolite according to the present invention, the molar ratio between Si and Al in terms of $SiO_2/Al_2O_3$ is in a range of $5 < (SiO_2/Al_2O_3) < 10$, and furthermore, preferably $7 < (SiO_2/Al_2O_3) < 10$. The $SiO_2/Al_2O_3$ molar ratio of 10 or more (excessively small Al content) is not preferable, because NFA is sometimes not sufficiently generated. Also, when the $SiO_2/Al_2O_3$ molar ratio is in a range of 5 or less (excessively large Al content), the chabazite zeolite is not easily synthesized. Furthermore, even if the chabazite zeolite can be synthesized, crystallizability sometimes decreases. Therefore, the molar ratio of 5 or less is not preferable.

The average crystal size of the zeolite according to the present invention is in a range of 0.05 μm<average crystal size<1 μm, and furthermore, preferably 0.1 μm≤ average crystal size≤0.5 μm. The average crystal size in the present invention is an average value for the sizes of primary particles of the zeolite according to the present invention measured by observation through an electron microscope or the like.

When the average crystal size of the zeolite according to the present invention is 1 μm or more, the number of contact points per unit volume between crystals of the chabazite zeolite decreases. This reduces the strength of the coat layer. Thus, the average crystal size of 1 μm or more is not preferable. Also, the average crystal size of 0.05 μm or less is not preferable, because the crystallizability of the chabazite zeolite decreases. When the chabazite zeolite is used for a use in which the crystallizability thereof has effect (for example, an automobile exhaust gas purification catalyst), the chabazite zeolite having low crystallizability is sometimes unsuitable for the use.

According to the zeolite of the present invention, the standard deviation of the particle size distribution obtained by laser diffraction particle size distribution measurement is preferably 0.2 or more. The standard deviation of the particle size distribution defined in the present invention is a measure for determining whether the particle size of the chabazite zeolite is uniform or non-uniform. Large standard deviations of the particle size distribution indicate non-uniform particle size distributions.

As illustrated in FIG. 1, the zeolite according to the present invention (Example 1) includes more particles of 1 μm or less than particles of 1 μm or more. Accordingly, the particle size distribution is extraordinarily broad (the particle size is non-uniform), compared to the chabazite zeolites according to Comparative Examples 1 to 3. When the chabazite zeolite having such a non-uniform particle size is used to form a coat layer on a substrate, the strength of the coat layer increases. It is considered that this is because inter-particle spaces occurring to particles of 1 μm or more are filled with particles of less than 1 μm and thereby increasing the number of contact points per unit volume between crystals of the chabazite zeolite.

In the zeolite according to the present invention, the shape of primary particles is preferably not a cube, a rectangular parallelepiped, nor an aggregate thereof, but a polyhedron having more planes than a hexahedron. In general, crystals of a chabazite zeolite often have the shape of a cube, a rectangular parallelepiped, or an aggregate thereof, as in FIG. 3 to FIG. 5 (electron micrographs of Comparative Examples 1 to 3). Therefore, when these zeolites are used to form a coat layer, the number of contact points per unit volume between zeolite crystals decreases. Accordingly, the strength of the coat layer decreases. On the other hand, the shape of the zeolite according to the present invention is substantially not a cube, a rectangular parallelepiped, nor an aggregate of a cube and a rectangular parallelepiped, as in FIG. 2 (Example 1). Therefore, the number of contact points per unit volume between zeolite crystals increases in a coat layer formed with the zeolite according to the present invention on a substrate. This further increases the strength of the coat layer.

The zeolite according to the present invention containing primary particles having the previously-described shape can be synthesized by an FAU conversion method described later. Specifically, a seed used in the FAU conversion method is milled, so that the ratio of a cube, a rectangular parallelepiped, and an aggregate thereof can decreases. This can increase the number of crystals having planes more than these shapes. It is noted that in the present invention, a zeolite containing a cube, a rectangular parallelepiped, and an aggregate thereof in an amount of 20 or less relative to 100 primary particles of a zeolite can be regarded as a zeolite which is substantially not a cube, a rectangular parallelepiped, nor an aggregate thereof.

The external surface area of the zeolite according to the present invention is preferably in a range of 30 $m^2/g \leq$ external surface area$<80$ $m^2/g$. As previously described, the zeolite according to the present invention has a small average crystal size. Also, the shape of the primary particles is substantially not a cube, a rectangular parallelepiped, nor an aggregate thereof. Accordingly, the particle size distribution is non-uniform. Therefore, the zeolite according to the present invention has a large external surface area compared to the chabazite zeolites according to Comparative Examples 1 to 3. When the chabazite zeolite having a large external surface area is used as, for example, an exhaust gas purification catalyst, the contact area with exhaust gas increases. Since this is likely to enhance catalytic activity, such a chabazite zeolite is preferable. Furthermore, when this zeolite is used as an automobile exhaust gas purification catalyst, the contact area with exhaust gas, which is a thermal medium, increases due to the large external surface area. Therefore, the effect of improving thermal responsiveness can also be obtained. Thermal responsiveness, in addition to catalytic activity, is also an important subject in the automobile exhaust gas purification catalyst (for example, JP-A-5-4048). The zeolite according to the present invention can be suitably used as a material for solving these problems.

The relative crystallinity of the zeolite according to the present invention is preferably 100% or more. The relative crystallinity in the present invention is one of the indices representing the crystallizability of zeolite. This relative crystallinity refers to the ratio (H/$H_R$) of the crystallinity (H) of the chabazite zeolite relative to the crystallinity ($H_R$) of a reference material synthesized by the manufacturing method of a chabazite zeolite presented by International Zeolite Association. When a chabazite zeolite having a relative crystallinity of less than 100% is used for a use in which the crystallizability of the chabazite zeolite has effect (for example, an exhaust gas purification catalyst), it is sometimes unsuitable for the use. Therefore, the relative crystallinity of less than 100% is not preferable.

The specific surface area of the zeolite according to the present invention is preferably in a range of 300 to 600 $m^2/g$. A large part of the specific surface area of zeolite is derived from the crystal structure. Therefore, the crystallinity of the zeolite having a low specific surface area tends to be low. Thus, low specific surface areas are not preferable. On the other hand, a zeolite having a specific surface area of more than 600 $m^2/g$ is difficult to synthesize.

The zeolite according to the present invention may include, as a cation, an element in a varied form, such as a proton, alkali metal, alkaline earth metal, transition metal, and a mixture of at least two of these, in the crystal structure.

The zeolite according to the present invention also includes a zeolite according to the present invention which supports an active component such as Cu and Fe. The content of the active component such as transition metal is preferably in a range of 1 to 10% by mass relative to the total amount of the zeolite according to the present invention. The zeolite according to the present invention supporting an active component can be suitably used as, for example, an exhaust gas purification catalyst.

[Manufacturing Method of Zeolite According to the Present Invention]

Known methods for manufacturing a chabazite zeolite include a method (a template method) of using a structure-directing agent (also referred to as an SDA or a template) and a method (an FAU conversion method) of using a faujasite zeolite (also referred to as an FAU) as a starting material.

The template method is a method of hydrothermally treating a slurry or aqueous solution which contains a structure-directing agent as well as an Si source, an Al source, and an alkali source to synthesize a chabazite zeolite. According to this method, Si and Al constituting the basic framework of a chabazite zeolite are hydrothermally treated together with an alkali source in the presence of an SDA which serves as a template of a chabazite structure. Accordingly, a chabazite zeolite is crystallized.

The FAU conversion method is a method of hydrothermally treating a slurry containing an alkali source and a faujasite zeolite (FAU) to convert the FAU into a chabazite zeolite. In this method, the FAU is an Si source and an Al source. The hydrothermal treatment of the FAU in the presence of an alkali source causes the basic framework of the FAU to be rearranged. As a result, a chabazite zeolite is generated. Therefore, the FAU conversion method eliminates the need for an SDA like the template method. Thus, since an expensive SDA is not used in the FAU conversion method, the FAU conversion method is cost effective. Also, since waste fluids of organic matter are not caused, the load on the environment is low. Consequently, the FAU conversion method has great advantages in the industrial production.

The zeolite according to the present invention can be synthesized by the FAU conversion method which includes (1) a process of preparing a raw material slurry, (2) a process of wet milling the raw material slurry to prepare a milled slurry, and (3) a process of hydrothermally treating the milled slurry. Specifically, in the FAU conversion method, a chabazite zeolite is added as a seed in the process of preparing a raw material slurry, and the synthesis conditions of the hydrothermal treatment process is adjusted. Accordingly, a chabazite zeolite containing a large amount of NFA, like Example 1, can be synthesized. On the other hand, the chabazite zeolite synthesized by the template method tends to contain a smaller amount of NFA, like Comparative Examples 1 to 3. The method for synthesizing the zeolite according to the present invention will described in detail below.

[Preparation Process of Raw Material Slurry]

In this process, a raw material slurry containing an FAU, an alkali source, a seed, and water is prepared. As the FAU, any conventionally known zeolite can be used as long as it is a zeolite having a faujasite structure. For example, a conventionally known Y-type zeolite or the like can be used. As the Y-type zeolite, an NaY-type zeolite (NaY), an ultra-stable Y-type zeolite (USY), a rare earth ion exchange-type Y-type zeolite (ReY), or the like can be used.

The above-described USY can be synthesized by, for example, the following method. Firstly, an NaY-type zeolite is subjected to ion exchange with ammonium sulfate to obtain $(NH_4)_{(0.75\ to\ 0.90)}Na_{(0.25\ to\ 0.10)}$—Y as a product. Thereafter, the product is washed, and furthermore, subjected to heat treatment at 200 to 600° C. From the resultant product, remaining $Na^+$ is removed by performing ion exchange again. The obtained product in a metastable state is subsequently subjected to rapid heating under a steam atmosphere at 600 to 800° C.

As the alkali source, sodium-containing salt or potassium-containing salt can be used. Specifically, sodium hydroxide, potassium hydroxide, or the like is suitably used. It is noted that in the FAU conversion method, the use of sodium salt as an alkali source inhibits the generation of a chabazite zeolite. Therefore, potassium salt is suitably used.

As the seed, any zeolite conventionally known as a chabazite zeolite can be used. For example, there can be used a chabazite zeolite which is synthesized by the method for synthesizing a chabazite described in the website (http://www.iza-online.org.synthesis/) of International Zeolite Association or in "VERIFIED SYNTHESES OF ZEOLITIC MATERIALS," H. Robson, Ed., K. P. Lillerud, XRD patterns: 2001, 2nd edition, pp 123-125.

The ratio between Si and Al of the raw material slurry, in terms of the $SiO_2/Al_2O_3$ molar ratio, is preferably in a range of $5<SiO_2/Al_2O_3<10$. When this ratio is within the above-described range, there can be obtained a chabazite zeolite which contains a small amount of impurities and has high crystallizability. Furthermore, as previously described, the molar ratio of 10 or more is not preferable, because the NFA is sometimes not sufficiently generated. Also, the molar ratio of 5 or less is not preferable, because the chabazite zeolite is difficult to synthesize. This ratio can be controlled by adjusting the added amounts of the FAU and the seed as raw materials.

A preferable ratio between Al and $H_2O$ of the raw material slurry, in terms of the $H_2O/Al_2O_3$ molar ratio, is in a range of 100 to 800. When this ratio is within the above-described range, there can be obtained a chabazite zeolite which contains a small amount of impurities and has high crystallizability, with a high yield. When this ratio is less than 100 (that is, when the raw material concentration is high), a by-product can be generated during the hydrothermal treatment. Also, the crystallizability of the obtained chabazite zeolite can decrease. Therefore, the molar ratio of less than 100 is not preferable. Also, when this ratio is more than 800, the raw material concentration decreases. Therefore, the yield of a chabazite zeolite decreases. As a result, productivity decreases. Thus, the ratio of more than 800 is not preferable.

[Preparation Process of Milled Slurry]

In this process, the raw material slurry is wet milled to prepare a milled slurry. As the wet milling, there can be used any method conventionally known as a method in which a raw material slurry can be milled as it is in a slurry state. For example, ball milling, bead milling, or the like can be used.

In this process, it is important to wet mill the FAU and the seed which coexist in the raw material slurry. The method of separately wet milling the FAU and the seed and thereafter mixing these raw materials is not preferable, because a phase different from a chabazite zeolite is likely to be generated. When the FAU and the seed are separately wet milled, particles obtained by milling are reaggregated in each slurry, leading to the generation of an aggregate. Therefore, when these are mixed, the aggregate of the FAU and the aggregate of the seed separately exist in the milled slurry. When the FAU and the seed are not uniformly mixed in the milled slurry in this manner, a reaction becomes non-uniform. As a result, a phase different from a chabazite zeolite is likely to be generated.

On the other hand, when the FAU and the seed are wet milled in a state in which they coexist, particles of the FAU and the seed obtained by milling are aggregated in the milled slurry to generate an aggregate. Therefore, a different phase is unlikely to be generated. Furthermore, two peaks exist in the particle size distribution (the particle size distribution measured using a laser diffraction particle size distribution analyzer) of the milled slurry obtained in this process. That is, it is suggested that the aggregate containing the FAU and the seed contained in the milled slurry is non-uniform in size. Thus, the hydrothermal treatment of the milled slurry containing an aggregate having a non-uniform size under the later-described conditions facilitates the generation of a chabazite zeolite having a non-uniform particle size distribution, like the zeolite according to the present invention.

The wet milling may be performed such that the total strength (Ha) of the FAU contained in the milled slurry becomes 0.7 or less (0.7Ha≥Hb) with respect to the total strength (Hb) of three peaks [peaks assigned to Miller indices of (111), (331), and (533)] appearing in the X-ray diffraction pattern of the FAU contained in the raw material slurry.

[Hydrothermal Treatment Process]

In this process, the milled slurry is hydrothermally treated. In the hydrothermal treatment, the above-described milled slurry charged in a closed container such as an autoclave is heated at a prescribed temperature. The temperature in the hydrothermal treatment is preferably in a range of 80 to 180° C. The hydrothermal treatment temperature of lower than 80° C. is not preferable, because the crystallization of the chabazite zeolite takes excessive time. The hydrothermal treatment temperature of higher than 180° C. is not preferable, because the reactivity of the milled slurry becomes excessively high, sometimes leading to the generation of a different phase.

The hydrothermal treatment time may be in a range of about 12 to 96 hours. It is noted that the hydrothermal treatment time is a period of time during which a temperature having reached the range of ±10° C. from a temperature set at 80 to 180° C. is kept.

The content of the NFA of the zeolite according to the present invention can be controlled by adjusting the temperature and time of the hydrothermal treatment to fall within the above-described ranges.

The hydrothermally treated milled slurry contains a chabazite zeolite. Therefore, liquid contents are removed by filtration, centrifugation, spray drying, or the like. Unreacted raw materials or the like sometimes remain in the resulting chabazite zeolite. Therefore, these may be removed by washing with warm water or the like, as necessary. It is noted that the NFA remains in the zeolite according to the present invention even when the washing operation or the like is performed.

After the hydrothermal treatment process, the solid-liquid separated chabazite zeolite is preferably calcined at a temperature of 300 to 500° C.

After the hydrothermal treatment process, alkali metal contained in the chabazite zeolite and transition metal or the like may be subjected to ion exchange, as necessary. It is noted that for efficiently performing ion exchange between alkali metal and transition metal or the like, the chabazite zeolite may be once immersed in an aqueous solution containing ammonium sulfate or the like, so that ion exchange proceeds between alkali metal and ammonium ions. Thereafter, the chabazite zeolite having subjected to ion exchange with ammonium ions can be immersed in an aqueous solution containing transition metal or the like, so that ion exchange proceeds between ammonium ions and transition metal or the like.

A substrate can be coated with the zeolite according to the present invention by conventionally known methods. For example, a substrate can be coated with a slurry prepared by dispersing the zeolite according to the present invention in a solvent, by a wash coat method, a dip coat method, or the like.

The substrate to be coated with the zeolite according to the present invention may be monolith-like, mesh-like, or honeycomb-like. The material of the substrate can be any conventionally known material such as metal and an inorganic compound. Particularly, an inorganic compound containing Si or Al is preferable. The substrate including the Si or Al-containing inorganic compound is more preferable, because the adhesion with the NFA contained in the zeolite according to the present invention is enhanced. Even with a substrate which contains neither of Si and Al, the use of an Si or Al-containing inorganic binder as a binder enables the operation and effect of the present invention to be sufficiently exerted.

EXAMPLES

Examples of the present invention will be described below together with Comparative Examples. It is noted that the present invention is not limited to these Examples. Also, there will be described below a determination method of a chabazite structure, a measurement method of a composition, an evaluation method of crystallizability, a measurement method of an average crystal size, a measurement method of an $SiO_2/Al_2O_3$ molar ratio, a standard deviation measurement method of a particle size distribution, an external surface area measurement method, a measurement method of a ratio of NFA and Al other than NFA, a measurement method of a specific surface area, and a measurement method of a peeling rate.

From the X-ray diffraction measurement of a manufactured zeolite under the following conditions, the presence or absence of a chabazite structure was determined.
<X-Ray Diffraction Measurement Conditions>
Apparatus: MiniFlex (manufactured by Rigaku Corporation)
Operation axis: 2θ/θ
Radiation source: CuKα
Measurement method: continuous
Voltage: 40 kV
Current: 15 mA
Start angle: 2θ=5°
End angle: 2θ=50°
Sampling width: 0.020°
Scanning speed: 10.000°/min
<Determination Criteria>
When the X-ray diffraction pattern obtained by the above-described measurement has all of the peaks assigned to Miller indices (100), (200), (2 0−1), (2 1−1), (211), (3−1−1), (310), and (3−1−2), it is determined that the zeolite has a chabazite structure (CHA). It is noted that the peak position of each peak can include an error of about 2θ=±0.2°.
<Measurement Method of $SiO_2/Al_2O_3$ Molar Ratio>

The contents of Si and Al of the manufactured zeolite were measured under the following conditions. The contents of the components were calculated as % by mass in terms of oxides. Also, the contents of the components were converted into a molar ratio thereby calculating an $SiO_2/Al_2O_3$ molar ratio.
<Content Measurement of $SiO_2$ and $Al_2O_3$>
Measurement method: ICP emission analysis
Apparatus: ICP730-ES (manufactured by VARIAN, Inc.)
Sample dissolution: acid dissolution
<Evaluation of Crystallizability>

A reference material was synthesized based on the method for synthesizing a chabazite described in the website (http://www.iza-online.org.synthesis/) of International Zeolite Association or in "VERIFIED SYNTHESES OF ZEOLITIC MATERIALS," H. Robson, Ed., K. P. Lillerud, XRD patterns: 2001, 2nd edition, pp 123-125. Under the following conditions, this reference material and the zeolite manufactured in a manner described in Examples were subjected to X-ray diffraction measurement. From each of the obtained X-ray diffraction patterns, the crystallizability (relative crystallinity) of the zeolite was calculated based on the equation below.
<X-Ray Diffraction Measurement Conditions>
Apparatus: MiniFlex (manufactured by Rigaku Corporation)
Operation axis: 2θ/θ
Radiation source: CuKα
Measurement method: continuous
Voltage: 40 kV
Current: 15 mA
Start angle: 2θ=5°
End angle: 2θ=50°
Sampling width: 0.020°
Scanning speed: 10.000°/min
<Relative Crystallinity>

From the X-ray diffraction patterns obtained by the above-described X-ray diffraction measurement, the total value of the heights of the peaks assigned to Miller indices (100), (2 0−1), and (3−1−1) was calculated. Also, the relative crystallinity was calculated according to the following equation.

$$\text{Relative crystallinity}[\%] = H/H_R \times 100$$

H: total of heights of peaks of zeolite obtained in Example
$H_R$: total of heights of peaks of reference material
The average crystal size of the manufactured zeolite was measured by the following method.
[Measurement Conditions of Average Crystal Size]

Under the following conditions, the zeolite manufactured in a manner described in Examples was observed through an electron microscope. It is noted that the magnification may not be necessarily the same as the following condition, as long as it allows the size of primary particles to be checked. From the obtained image, the average crystal size was measured.
<Conditions of Electron Microscope Observation>
Measuring apparatus: JEOL JSM-7600
Acceleration voltage: 1.0 kV
Magnification: 20,000 times <Calculation Method of Average Crystal Size>

An average value for the long diameters of ten primary particles randomly extracted from the electron microscope image was defined to be the size of primary particles.

From the particle size distribution measurement of the zeolite manufactured in a manner described in Examples, which was performed under the following conditions, the standard deviation was calculated.

<Particle Size Distribution Measurement>

Measurement apparatus: HORIBA LA950 V2
Dispersant: sodium hexametaphosphate aqueous solution
Refractive index: 1.465

The standard deviation was calculated based on the data obtained by the above-described particle size distribution measurement, using the particle size distribution standard deviation calculation method described on the website (http://www.an.shimadzu.co.jp) of Shimadzu Corporation. A specific calculation method will be illustrated below.

<Standard Deviation Calculation Method>

The particle size range (maximum particle size: $x_1$, minimum particle size: $x_{n+1}$) to be measured is divided into n separate particle size intervals, and each of the intervals is represented by $[x_j, x_{j+1}]$ (j=1, 2, .... N). (In this case, the intervals are equal divisions on the logarithmic scale). Also, based on the logarithmic scale, the representative particle size in each particle size interval is calculated according to the following formula.

$$\frac{\log_{10} X_j + \log_{10} X_{j+1}}{2} \quad \text{[Mathematical Formula 1]}$$

Furthermore, the relative particle amount (difference %) corresponding to the particle size interval $[x_j, x_{j+1}]$ is represented by $q_j$ (j=1, 2, ... n). The total of the relative particle amounts (difference %) of all intervals is 100%. The average value μ on the logarithmic scale is calculated according to the following formula.

$$\mu = \frac{1}{100} \sum_{j=1}^{n} q_j \left( \frac{\log_{10} X_j + \log_{10} X_{j+1}}{2} \right) \quad \text{[Mathematical Formula 2]}$$

Based on this μ, the standard deviation (σ) defined on the logarithmic scale was calculated according to the following formula.

$$\sigma = \sqrt{\left\{ \frac{1}{100} \sum_{j=1}^{n} q_j \left( \frac{\log_{10} X_j + \log_{10} X_{j+1}}{2} \right)^2 \right\} - \mu^2} \quad \text{[Mathematical Formula 3]}$$

Under the following conditions, the external surface area of the obtained zeolite was measured.

<External Surface Area Measurement Method>

Measurement method: nitrogen adsorption method
Measurement apparatus: BELSORP-mini II (manufactured by BEL Japan, Inc.)
Sample amount: about 0.05 g
Pre-treatment: 300° C., 2 hours (under vacuum)
Relative pressure range: 0 to 1.0
Calculation method total pore volume: 0.990
Specific surface area, external surface area: t-plot method Under the following conditions, the zeolite manufactured in a manner described in Examples was subjected to $^{27}$Al-NMR measurement. From a spectrum obtained by the measurement, the ratio of NFA in all Als contained in the zeolite was calculated.

<$^{27}$Al-NMR Measurement Conditions>

Measurement apparatus: VNMR-600 manufactured by Agilent Technologies, Inc.

A powder sample was uniformly charged in a 3.2 mm-diameter sample tube for NMR solid. The sample tube set to a 14.1 T NMR apparatus (NMR-600 manufactured by Agilent Technologies, Inc., 1H resonance frequency: 600 MHz) was spun with a high speed of 20 kHz at the magic angle (54.7°) with respect to the external magnetic field. The $^{27}$Al resonance frequency at this time was 156.3 MHz. As a chemical shift reference of $^{27}$Al-NMR, the peak of a 1 mol/l Al(NO$_3$)$_3$ aqueous solution was set to 0 ppm. A single pulse method was used in the measurement. The flip angle of the pulse was set to 10°. The pulse repetition time was set to 0.1 s. The resulting spectrum was approximated by the Voigt function for peak separation. It was determined that peaks appearing near a chemical shift of 50 to 60 ppm are assigned to Al of NA. It was determined that the other peaks are assigned to Al of NFA. Then, the peak area ($A_{NFA}$) of the other peaks was calculated. Then, the total peak area ($A_{Total}$) of all peaks was also calculated. According to the following equation, the ratio of NFA in all Als contained in the zeolite was calculated.

Ratio of NFA in all Als contained in zeolite=$A_{NFA}/A_{total}\times$100 [%]

Under the following conditions, the specific surface area of the manufactured zeolite was measured.

An aqueous solution (100 g) containing 10 g of zeolite and 5 g of ammonium sulfate was increased in temperature to 60° C. This aqueous solution was subjected to ion exchange for 1 hour while stirring. Thereafter, filtration and washing were performed. This operation was performed twice. Under the following conditions, the specific surface area of the zeolite obtained by the above-described method was measured.

Measurement method: nitrogen adsorption method (BET multipoint method)
Measurement apparatus: BELSORP-mini II (manufactured by MicrotracBEL Corp.)
Pre-treatment: 300° C., 2 hours (under nitrogen flow)
Sample mass: 0.05 g Under the following conditions, the zeolite obtained in Examples was subjected to a peeling test. The peeling rate was calculated.

<Peeling Test Method>

There were mixed 100 g of the manufactured zeolite powder, 15 g of an alumina hydrate fine particle powder (manufactured by JGC Catalysts and Chemicals Ltd.: AP-1, Al$_2$O$_3$ content 72% by weight, average particle size 200 nm) as an inorganic binder component, and 200 g of pure water. The mixture was mixed and homogenized while stirring for 3 hours to obtain a slurry. Then, a method (wash coat method) of pulling up a cordierite ceramic honeycomb substrate immersed in the slurry was used. By this method, a uniform catalyst layer was formed on a substrate which was coated such that the catalyst coat density became 100 g/L. Next, the obtained product was dried under air at 150° C. for 12 hours, and thereafter calcined at 600° C. for 3 hours. Accordingly, a honeycomb substrate was obtained.

Under the following conditions, the obtained honeycomb substrate was subjected to a peeling test.

<Peeling Test>

Apparatus: shaker (manufactured by IWAKI)

Shaking frequency: 300 spm

The weight ($M_0$) of the honeycomb substrate was measured. Thereafter, the honeycomb substrate was charged in a graduated cylinder. After shaking for 15 minutes, the weight ($M_A$) of the honeycomb substrate taken out was measured. From the weight ($M_0$) of the honeycomb substrate before shaking and the weight after shaking, the peeling rate (%) was calculated according to the following equation.

$$\text{Peeling rate (\%)} = (M_0 - M_A)/M_0 \times 100$$

Example 1

[FAU Preparation Process]

To 1.35 kg of a stirred sodium hydroxide aqueous solution having an NaOH concentration of 21.65% by mass, there was added 0.168 kg of a sodium aluminate aqueous solution having an $Al_2O_3$ concentration of 22% by mass and an $Na_2O$ concentration of 17% by mass. The obtained solution was cooled to 30° C. While stirring, this solution was added to 1.361 kg of a sodium silicate aqueous solution having an $SiO_2$ concentration of 24% by mass and an $Na_2O$ concentration of 7.7% by mass. At this time, this solution had the following composition in a molar ratio in terms of oxides. Next, this solution was left to stand at 30° C. for 15 hours. In this manner, an aluminosilicate solution was prepared.

$Na_2O/Al_2O_3 = 16$ $SiO_2/Al_2O_3 = 15$ $H_2O/Al_2O_3 = 330$

To 22.78 kg of a sodium silicate aqueous solution having an $SiO_2$ concentration of 24% by mass and an $Na_2O$ concentration of 7.7% by mass, there were added 5.66 kg of water, 18.97 kg of silica sol (manufactured by JGC Catalysts and Chemicals Ltd.: Cataloid SI-30: average particle size 10 nm) having an $SiO_2$ concentration of 30% by mass, and 2.88 kg of the aluminosilicate solution. Thereafter, the mixture was stirred and mixed. Subsequently, to the resultant mixture, there was added 10.03 kg of a sodium aluminate aqueous solution having an $Al_2O_3$ concentration of 22% by mass and an $Na_2O$ concentration of 17% by mass. The obtained mixture was stirred at room temperature over 3 hours for aging. In this manner, a mixed hydrogel slurry was prepared. At this time, the mixed hydrogel slurry had the following composition in a molar ratio in terms of oxides.

$Na_2O/Al_2O_3 = 2.80$ $SiO_2/Al_2O_3 = 8.70$ $H_2O/Al_2O_3 = 108$

The mixed hydrogel slurry (60.3 kg) was hydrothermally treated in a crystallization tank at 95° C. for 35 hours. Thereafter, the gel was cooled to 70° C., and filtered to obtain 29.5 kg of an Na—Y-type zeolite cake. The obtained Na—Y-type zeolite cake was further washed, filtered, and dried. In this manner, an Na—Y-type zeolite was prepared.

An aqueous solution (5000 g) containing 500 g of the Na—Y-type zeolite and 280 g of ammonium sulfate was increased in temperature to 80° C. This aqueous solution was subjected to ion exchange for 2 hours while stirring. Thereafter, this solution was filtered, washed, and dried, and thereafter calcined at 550° C. for 5 hours. Furthermore, an operation of ion exchange, filtering, washing, and drying under the above-described conditions was performed twice. Accordingly, there was prepared a $0.95(NH_4)_2O \cdot 0.05Na_2O \cdot Al_2O_3 \cdot 5SiO_2$ zeolite (also referred to as an $NH_{4(95)}$Y-type zeolite) having an $NH_4$ ion exchange rate of 95%.

Next, water was added to the $NH_{4(95)}$Y-type zeolite to adjust the water content such that the zeolite contains 50% by mass of water content. The $NH_{4(95)}$Y-type zeolite having been adjusted in water content was charged in a container, increased in temperature to 600° C., and subjected to steam treatment for 2 hours. Accordingly, an ultra-stable FAU zeolite was prepared.

To 500 g of this ultra-stable FAU zeolite, 825 g of sulfuric acid having a concentration of 25% by mass was dropped over 0.5 hour for dealumination treatment. Accordingly, an FAU zeolite of $SiO_2/Al_2O_3 = 10.0$ was prepared.

[Raw Material Slurry Preparation Process]

The concentration of this FAU zeolite was adjusted to 11% by mass by mixing 846 g of pure water and 104 g of the FAU zeolite. Next, there was added 16 g ($SiO_2/Al_2O_3$ molar ratio 4.5) of a chabazite zeolite obtained by the method for synthesizing a chabazite described in "VERIFIED SYNTHESES OF ZEOLITIC MATERIALS," H. Robson, Ed., K. P. Lillerud, XRD patterns: 2001, 2nd edition, pp 123-125. Next, 34 g of KOH having a concentration of 95.5% by mass was mixed to obtain a raw material slurry. At this time, the molar ratio between Si and Al of the raw material slurry was 9.3 in terms of $SiO_2/Al_2O_3$.

[Milled Slurry Preparation Process]

This raw material slurry was wet milled using a bead mill (manufactured by Ashizawa Finetech Ltd.: LMZ015) to obtain a milled slurry. The wet milling was performed until the total strength (Hb) of three peaks [peaks assigned to Miller indices (111), (331), and (533)] appearing in the X-ray diffraction pattern of the FAU contained in the raw material slurry became not more than half ($0.5Ha \geq Hb$) the total strength (Ha) of the FAU contained in the milled slurry. At this time, the conditions of the wet milling were a zirconia bead size of 0.5 mm and a peripheral speed of 10 m/s. The amount of charged beads was 85% in terms of volume.

The above-described milled slurry was hydrothermally treated at 150° C. for 48 hours. Thereafter, the hydrothermally treated milled slurry was removed, and filtered, washed, and dried to obtain a zeolite.

Figure 2:
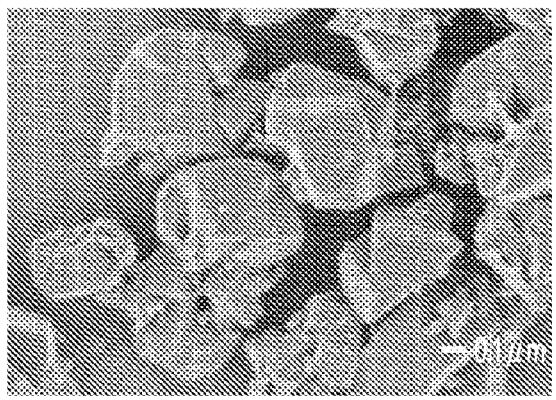
FIG. 2 is an electron micrograph of a zeolite according to Example 1.

It was confirmed that the obtained zeolite was a chabazite zeolite by the previously-described determination method of a chabazite structure. Furthermore, the attributes of the zeolite were evaluated based on the previously-described measurement method of a composition, evaluation method of crystallizability, measurement method of an average crystal size, measurement method of an $SiO_2/Al_2O_3$ molar ratio, standard deviation measurement method of a particle size distribution, external surface area measurement method, measurement method of a ratio of NFA and Al other than NFA, measurement method of a specific surface area, and measurement method of a peeling rate. The result is shown in Table 1. Also, the particle size distribution is illustrated in FIG. 1. The electron micrograph is illustrated in FIG. 2.

Example 2

To 500 g of the ultra-stable FAU zeolite prepared in Example 1, 650 g of sulfuric acid having a concentration of 25% by mass was dropped over 0.5 hour for dealumination treatment. Accordingly, an FAU zeolite of $SiO_2/Al_2O_3 = 8.8$ was prepared.

[Raw Material Slurry Preparation Process]

The concentration of this FAU zeolite was adjusted to 11% by mass by mixing 844 g of pure water and 107 g of the FAU zeolite. Next, 15 g ($SiO_2/Al_2O_3$ molar ratio 4.5) of the chabazite zeolite used in Example 1 was added. Next, 34 g of KOH having a concentration of 95.5% by mass was mixed to obtain a raw material slurry. At this time, the molar ratio between Si and Al of the raw material slurry was 8.1 in terms of $SiO_2/Al_2O_3$.

The subsequent processes and evaluation were performed in a manner similar to Example 1. The result is shown in Table 1.

Example 3

Into 500 g of a 1 mol/L copper nitrate trihydrate solution, 50 g of the chabazite zeolite obtained in Example 2 was suspended. Accordingly, a slurry was prepared. This slurry was increased in temperature to 80° C. while stirring and subjected to ion exchange for 1 hour. Thereafter, the slurry was filtered and washed. This operation was repeated until the amount of supported Cu became 4% by mass. In this manner, a chabazite zeolite supporting Cu was obtained. This chabazite zeolite was evaluated in a manner similar to Example 1. The result is shown in Table 1.

Example 4

Into 500 g of a 1 mol/L ferrous suflate heptahydrate solution, 50 g of the chabazite zeolite obtained in Example 2 was suspended. Accordingly, a slurry was prepared. This slurry was increased in temperature to 80° C. while stirring and subjected to ion exchange for 1 hour. Thereafter, the slurry was filtered and washed. This operation was repeated until the amount of supported Fe became 3% by mass. In this manner, a chabazite zeolite supporting Fe was obtained. This chabazite zeolite was evaluated in a manner similar to Example 1. The result is shown in Table 1.

Example 5

To 500 g of the ultra-stable FAU zeolite prepared in Example 1, 270 g of sulfuric acid having a concentration of 25% by mass was dropped over 0.5 hour for dealumination treatment. Accordingly, an FAU zeolite of $SiO_2/Al_2O_3=6.0$ was prepared.

[Raw Material Slurry Preparation Process]

The concentration of this FAU zeolite was adjusted to 11% by mass by mixing 844 g of pure water and 107 g of the FAU zeolite. Next, 15 g ($SiO_2/Al_2O_3$ molar ratio 4.5) of the chabazite zeolite used in Example 1 was added. Furthermore, 34 g of KOH having a concentration of 95.5% by mass was mixed to obtain a raw material slurry. At this time, the molar ratio between Si and Al of the raw material slurry was 5.8 in terms of $SiO_2/Al_2O_3$.

[Milled Slurry Preparation Process]

This raw material slurry was wet milled using a bead mill (manufactured by Ashizawa Finetech Ltd.: LMZ015) to obtain a milled slurry. The wet milling was performed until the total strength (Hb) of three peaks [peaks assigned to Miller indices (111), (331), and (533)] appearing in the X-ray diffraction pattern of the FAU contained in the raw material slurry became 0.6 of the total strength (Ha) of the FAU contained in the milled slurry. At this time, the conditions of the wet milling were a zirconia bead size of 0.5 mm and a peripheral speed of 10 m/s. The amount of charged beads was 85% in terms of volume.

The above-described slurry was hydrothermally treated at 150° C. for 48 hours. Thereafter, the hydrothermally treated milled slurry was removed, and filtered, washed, and dried to obtain a chabazite zeolite.

The concentration of the zeolite was adjusted to 11% by mass by mixing 110 g of the chabazite zeolite obtained in the previously-described processes and 890 g of pure water. Accordingly, a slurry was obtained. This slurry was milled using a bead mill (manufactured by Ashizawa Finetech Ltd.: LMZ015). At this time, the conditions of the wet milling were a zirconia bead size of 0.5 mm and a peripheral speed of 10 m/s. The amount of charged beads was 85% in terms of volume. The ratio (Hb/Ha) of the total strength (Hb) of three peaks [peaks assigned to Miller indices (100), (20–1), and (3–1–1)] appearing in the X-ray diffraction pattern of the chabazite zeolite contained in the slurry after milling relative to the total strength (Ha) of the three peaks appearing in the X-ray diffraction pattern of the chabazite zeolite contained in the slurry before milling was 0.95. Furthermore, the slurry after milling was filtered and dried to obtain a chabazite zeolite. This chabazite zeolite was evaluated in a manner similar to Example 1. The result is shown in Table 1.

Example 6

To 500 g of the ultra-stable FAU zeolite prepared in Example 1, 650 g of sulfuric acid having a concentration of 25% by mass was dropped over 0.5 hour for dealumination treatment. Accordingly, an FAU zeolite of $SiO_2/Al_2O_3=9.0$ was prepared.

The concentration of this FAU zeolite was adjusted to 11% by mass by mixing 850 g of pure water and 116 g of the FAU zeolite. Next, 40 g of KOH having a concentration of 95.5% by mass was mixed to obtain a raw material slurry. At this time, the molar ratio between Si and Al of the raw material slurry was 8.2 in terms of $SiO_2/Al_2O_3$. The subsequent processes was performed in a manner similar to Example 5 to obtain a chabazite zeolite.

The concentration of the zeolite was adjusted to 11% by mass by mixing 110 g of the chabazite zeolite obtained in the previously-described processes and 890 g of pure water. Accordingly, a slurry was obtained. This slurry was milled using a bead mill (manufactured by Ashizawa Finetech Ltd.: LMZ015). At this time, the conditions of the wet milling were a zirconia bead size of 0.5 mm and a peripheral speed of 10 m/s. The amount of charged beads was 85% in terms of volume. The ratio (Hb/Ha) of the total strength (Hb) of three peaks [peaks assigned to Miller indices (100), (20–1), and (3–1–1)] appearing in the X-ray diffraction pattern of the chabazite zeolite contained in the slurry after milling relative to the total strength (Ha) of the three peaks appearing in the X-ray diffraction pattern of the chabazite zeolite contained in the slurry before milling was 0.98. Furthermore, the slurry after milling was filtered and dried to obtain a chabazite zeolite. This chabazite zeolite was evaluated in a manner similar to Example 1. The result is shown in Table 1.

Example 7

To 500 g of the ultra-stable FAU zeolite prepared in Example 1, 650 g of sulfuric acid having a concentration of 25% by mass was dropped over 0.5 hour for dealumination treatment. Accordingly, an FAU zeolite of $SiO_2/Al_2O_3=9.0$ was prepared.

The concentration of this FAU zeolite was adjusted to 11% by mass by mixing 850 g of pure water and 116 g of the FAU zeolite. Next, 40 g of KOH having a concentration of 95.5% by mass was mixed to obtain a raw material slurry. At this time, the molar ratio between Si and Al of the raw material slurry was 8.2 in terms of $SiO_2/Al_2O_3$. The subsequent processes was performed in a manner similar to Example 5 obtain a chabazite zeolite.

The concentration of the zeolite was adjusted to 11% by mass by mixing 110 g of the chabazite zeolite obtained in the previously-described processes and 890 g of pure water. Accordingly, a slurry was obtained. This slurry was milled using a bead mill (manufactured by Ashizawa Finetech Ltd.: LMZ015). At this time, the conditions of the wet milling were a zirconia bead size of 0.5 mm and a peripheral speed of 10 m/s. The amount of charged beads was 85% in terms of volume. The ratio (Hb/Ha) of the total strength (Hb) of three peaks [peaks assigned to Miller indices (100), (20–1), and (3–1–1)] appearing in the X-ray diffraction pattern of the chabazite zeolite contained in the slurry after milling relative to the total strength (Ha) of the three peaks appearing in the X-ray diffraction pattern of the chabazite zeolite contained in the slurry before milling was 0.95. Furthermore, the slurry after milling was filtered and dried to obtain a chabazite zeolite. This chabazite zeolite was evaluated in a manner similar to Example 1. The result is shown in Table 1.

Example 8

To 2752 g of pure water, there were added 325 g of a 25% N,N,N-trimethyl adamantane ammonium aqueous solution (manufactured by SACHEM JAPAN Godo Kaisha), 2 g of potassium hydroxide having a KOH concentration of 95.5% by mass, 178 g of a sodium aluminate aqueous solution ($Al_2O_3$ concentration: 22% by mass, $Na_2O$ concentration: 17% by mass), and 243 g of fumed silica (Reolosil QS40 manufactured by Tokuyama Corporation). The mixture was thoroughly mixed. Accordingly, a raw material slurry was obtained. This raw material slurry was hydrothermally treated at 150° C. for 96 hours. Thereafter, the hydrothermally treated raw material slurry was removed, and filtered, washed, and dried to obtain a chabazite zeolite.

The concentration of the zeolite was adjusted to 11% by mass by mixing 110 g of the chabazite zeolite obtained in the previously-described processes and 890 g of pure water. Accordingly, a slurry was obtained. This slurry was milled using a bead mill (manufactured by Ashizawa Finetech Ltd.: LMZ015). At this time, the conditions of the wet milling were a zirconia bead size of 0.5 mm and a peripheral speed of 10 m/s. The amount of charged beads was 85% in terms of volume. The ratio (Hb/Ha) of the total strength (Hb) of three peaks [peaks assigned to Miller indices (100), (20–1), and (3–1–1)] appearing in the X-ray diffraction pattern of the chabazite zeolite contained in the slurry after milling relative to the total strength (Ha) of the three peaks appearing in the X-ray diffraction pattern of the chabazite zeolite contained in the slurry before milling was 0.90. Furthermore, the slurry after milling was filtered and dried to obtain a chabazite zeolite. This chabazite zeolite was evaluated in a manner similar to Example 1. The result is shown in Table 1.

Comparative Example 1

To 2836 g of pure water, there were added 327 g of a 25% N,N,N-trimethyl adamantane ammonium aqueous solution (manufactured by SACHEM JAPAN Godo Kaisha), 27 g of potassium hydroxide having a KOH concentration of 95.5% by mass, 65 g of a sodium aluminate aqueous solution ($Al_2O_3$ concentration: 22% by mass, $Na_2O$ concentration: 17% by mass), and 225 g of fumed silica (Reolosil QS40 manufactured by Tokuyama Corporation). The mixture was thoroughly mixed. Accordingly, a raw material slurry was obtained. This raw material slurry was hydrothermally treated at 150° C. for 96 hours. Thereafter, the hydrothermally treated raw material slurry was removed, and filtered, washed, and dried to obtain a chabazite zeolite.

Figure 3:
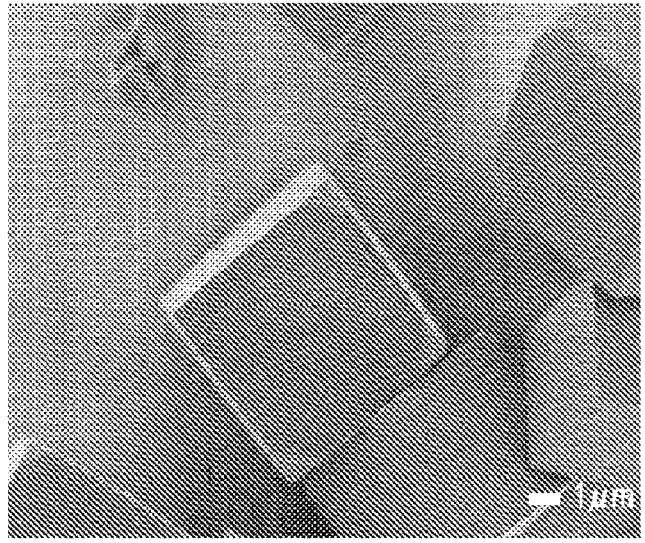
FIG. 3 is an electron micrograph of a zeolite according to Comparative Example 1.

The obtained chabazite zeolite was evaluated in a manner similar to Example 1. The result is shown in Table 1. Also, the particle size distribution is illustrated in FIG. 1. The electron micrograph is illustrated in FIG. 3.

Comparative Example 2

To 2793 g of pure water, there were added 326 g of a 25% N,N,N-trimethyl adamantane ammonium aqueous solution (manufactured by SACHEM JAPAN Godo Kaisha), 18 g of potassium hydroxide having a KOH concentration of 95.5% by mass, 119 g of a sodium aluminate aqueous solution ($Al_2O_3$ concentration: 22% by mass, $Na_2O$ concentration: 17% by mass), and 248 g of fumed silica (Reolosil QS40 manufactured by Tokuyama Corporation). The mixture was thoroughly mixed. Accordingly, a raw material slurry was obtained. This raw material slurry was hydrothermally treated at 150° C. for 96 hours. Thereafter, the hydrothermally treated raw material slurry was removed, and filtered, washed, and dried to obtain a chabazite zeolite.

Figure 4:
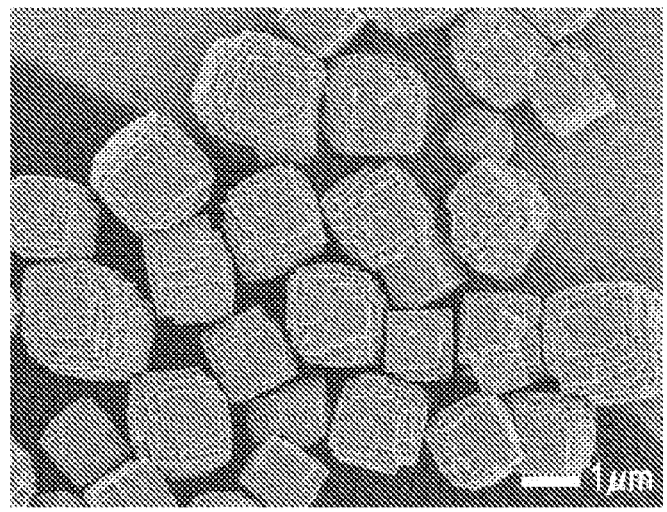
FIG. 4 is an electron micrograph of a zeolite according to Comparative Example 2.

The obtained zeolite was evaluated in a manner similar to Example 1. The result is shown in Table 1. Also, the particle size distribution is illustrated in FIG. 1. The electron micrograph is illustrated in FIG. 4.

Comparative Example 3

To 2751 g of pure water, there were added 324 g of a 25% N,N,N-trimethyl adamantane ammonium aqueous solution (manufactured by SACHEM JAPAN Godo Kaisha), 3 g of potassium hydroxide having a KOH concentration of 95.5% by mass, 177 g of a sodium aluminate aqueous solution ($Al_2O_3$ concentration: 22% by mass, $Na_2O$ concentration: 17% by mass), and 243 g of fumed silica (Reolosil QS40 manufactured by Tokuyama Corporation). The mixture was thoroughly mixed. Accordingly, a raw material slurry was obtained. This raw material slurry was hydrothermally treated at 150° C. for 96 hours. Thereafter, the hydrothermally treated raw material slurry was removed, and filtered, washed, and dried to obtain a chabazite zeolite.

Figure 5:
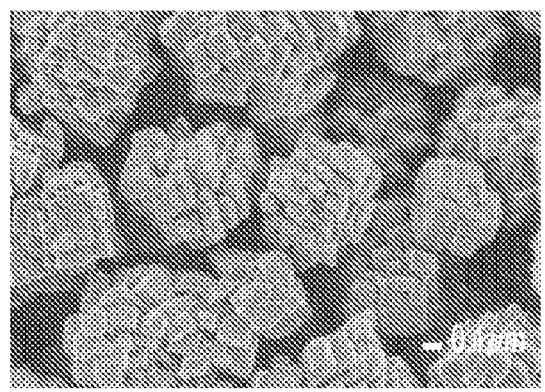
FIG. 5 is an electron micrograph of a zeolite according to Comparative Example 3.

The obtained chabazite zeolite was evaluated in a manner similar to Example 1. The result is shown in Table 1. Also, the particle size distribution is illustrated in FIG. 1. The electron micrograph is illustrated in FIG. 5.

TABLE 1

| | Presence or absence of CHA structure | SiO$_2$/Al$_2$O$_3$ Molar ratio [—] | Relative crystallinity [%] | Average crystal size [μm] | A$_{NF4}$/A$_{Total}$ [%] | Particle size distribution standard deviation [—] | External surface area [m$^2$/g] | Specific surface area [m$^2$/g] | Supported metal | Peeling rate [%] |
|---|---|---|---|---|---|---|---|---|---|---|
| Example 1 | Presence | 8 | 120 | 0.5 | 51 | 0.29 | 33 | 453 | — | 1.5 |
| Example 2 | Presence | 7.5 | 115 | 0.4 | 30 | 0.33 | 31 | 463 | — | 1.5 |
| Example 3 | Presence | 7.5 | 112 | 0.4 | 32 | 0.33 | 34 | 457 | Cu | 1.5 |
| Example 4 | Presence | 7.5 | 111 | 0.4 | 33 | 0.33 | 33 | 455 | Fe | 1.5 |
| Example 5 | Presence | 5.2 | 101 | 0.5 | 44 | 0.31 | 72 | 436 | — | 1.4 |
| Example 6 | Presence | 8 | 107 | 0.7 | 26 | 0.25 | 35 | 449 | — | 2.5 |
| Example 7 | Presence | 8 | 105 | 0.5 | 29 | 0.29 | 42 | 442 | — | 1.9 |
| Example 8 | Presence | 9.5 | 98 | 0.5 | 23 | 0.27 | 31 | 438 | — | 3 |
| Comparative Example 1 | Presence | 23 | 131 | 13 | 2 | 0.16 | 4 | 511 | — | 10.3 |
| Comparative Example 2 | Presence | 13 | 115 | 3 | 8 | 0.13 | 7 | 475 | — | 7.9 |
| Comparative Example 3 | Presence | 8 | 102 | 0.5 | 10 | 0.13 | 28 | 463 | — | 5.5 |

The invention claimed is:

1. A chabazite zeolite for substrate coating, wherein:
an SiO$_2$/Al$_2$O$_3$ molar ratio is in a range of 5<SiO$_2$/Al$_2$O$_3$<10,
an average crystal size is in a range of 0.05 μm<average crystal size<1 μm, and
in a spectrum measured by $^{27}$Al-NMR, an area range (A$_{NF4}$/A$_{Total}$) between an area (A$_{Total}$) of all peaks in the spectrum and an area (A$_{NF4}$) of peaks assigned to Al other than tetracoordinated Al is in a range of 20%≤(A$_{NF4}$/A$_{Total}$)≤70%, wherein the area range is calculated as A$_{NF4}$/A$_{total}$×100.

2. The chabazite zeolite for substrate coating according to claim 1, wherein
a standard deviation of a particle size distribution obtained by laser diffraction particle size distribution measurement is of 0.2≤standard deviation.

3. The chabazite zeolite for substrate coating according to claim 1, wherein an average crystal size is in a range of 0.1 μm≤average crystal size≤0.5 μm.

4. The chabazite zeolite for substrate coating according to claim 3, wherein an external surface area is in a range of 30 m$^2$/g≤external surface area<80 m$^2$/g.

5. The chabazite zeolite for substrate coating according to claim 4, wherein a relative crystallinity to a crystallinity of a reference material synthesized by a manufacturing method of a chabazite zeolite indicated by International Zeolite Association is more than 100%.

6. The chabazite zeolite for substrate coating according to claim 1, which supports Cu or Fe.

7. An automobile exhaust gas purification catalyst containing a substrate coated with the chabazite zeolite according to claim 6.

8. The chabazite zeolite for substrate coating according to claim 2, wherein an average crystal size is in a range of 0.1 μm≤average crystal size≤0.5 μm.

9. The chabazite zeolite for substrate coating according to claim 8, wherein an external surface area is in a range of 30 m$^2$/g≤external surface area<80 m$^2$/g.

10. The chabazite zeolite for substrate coating according to claim 9, wherein a relative crystallinity to a crystallinity of a reference material synthesized by a manufacturing method of a chabazite zeolite indicated by International Zeolite Association is more than 100%.

11. The chabazite zeolite for substrate coating according to claim 2, which supports Cu or Fe.

12. An automobile exhaust gas purification catalyst containing a substrate coated with the chabazite zeolite according to claim 11.

* * * * *